Aug. 2, 1966    F. E. PARKE    3,263,796
MAGNETIC CONVEYOR

Filed Dec. 18, 1964    3 Sheets-Sheet 1

INVENTOR.
FRANKLIN E. PARKE
BY
ATTORNEY

Aug. 2, 1966     F. E. PARKE     3,263,796
MAGNETIC CONVEYOR
Filed Dec. 18, 1964     3 Sheets-Sheet 2

INVENTOR.
FRANKLIN E. PARKE
BY
*signature*
ATTORNEY

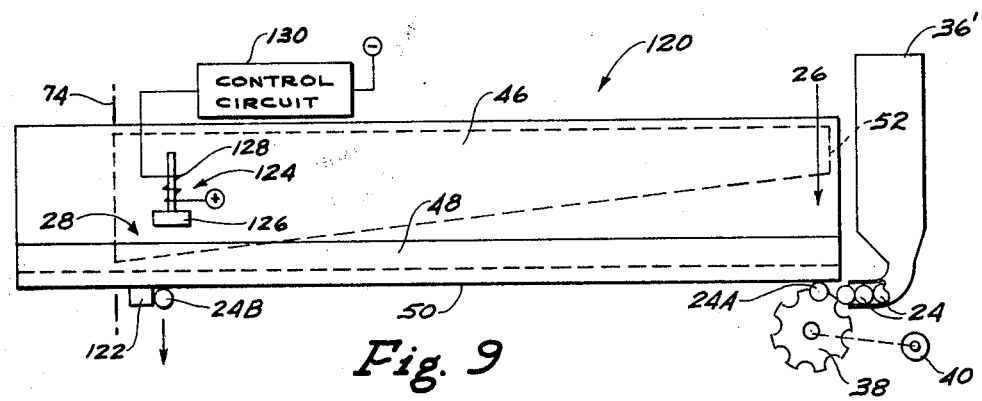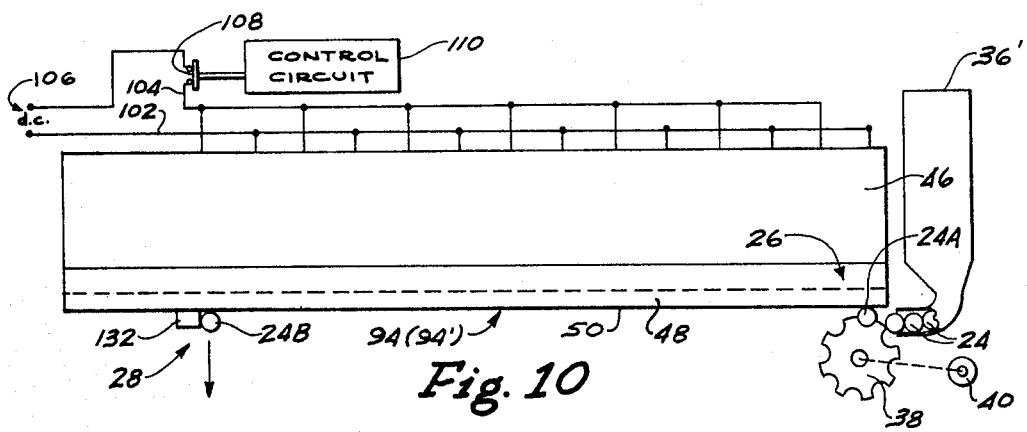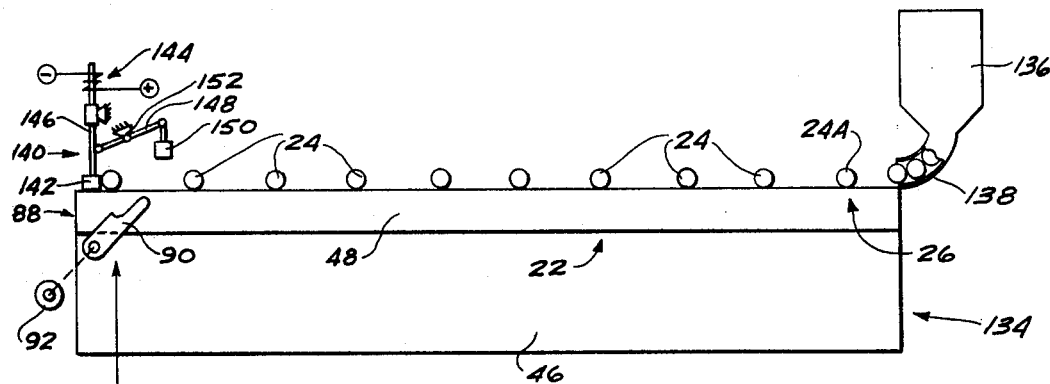

United States Patent Office 3,263,796
Patented August 2, 1966

3,263,796
MAGNETIC CONVEYOR
Franklin E. Parke, 767 Colony Circle,
Pittsburgh, Pa. 15216
Filed Dec. 18, 1964, Ser. No. 419,419
12 Claims. (Cl. 198—41)

This invention relates to conveyors, and more particularly to magnetic conveyors for transferring cylindrical articles formed from magnetically susceptible material.

As a primary object, the present invention seeks to provide a novel magnetic conveyor which quickly conveys magnetizable cylindrical articles individually from a feed position to a work position and thereafter discharges each article.

Another object of the invention is to provide a novel magnetic conveyor which automatically aligns each article with respect to extrinsic apparatus, said extrinsic apparatus being adapted to perform an operation on each article.

Still another object of the invention is to provide a novel magnetic conveyor employing a field intensity gradient for moving each article along the conveyor. That is to say, the present conveyor has no moving parts but relies on a magnet means whose field intensity increases in the direction of the aforesaid work position for moving each article.

A further object of the invention is to provide a novel magnetic conveyor which may be used in any desired position, that is, upright, inverted or inclined.

In accordance with the present invention, a guideway is provided along which the cylindrical magnetizable articles are to be moved from a feed or first position to a work or second position. Magnet means is provided which is positioned adjacent to the guideway and which preferably extends beyond the first and second positions. The magnet means produces a magnetic field surrounding the guideway whose field intensity varies from a minimum value adjacent to the first position to a maximum value adjacent to the second position. The variation of the field intensity preferably is continuous and substantially uniform along the guideway. Alternatively, the variation in the field intensity of the magnetic field may be in uniform steps. In either case, there is provided an increasing magnetic force along the length of the guideway which force acts on the magnetizable articles to propel them from the first position to the second position.

In one embodiment of the present invention, a unitary stop means and discharge means is provided which is disposed at the second position and engageable by each of the articles conveyed. As will be described, each article when in the second position is aligned with extrinsic apparatus which is adapted to perform an operation on the article. Thereafter, the unitary stop means and discharge means is activated to displace the magnetizable article away from the guideway for discharge therefrom. Preferably, that portion of the magnetic field having maximum intensity is positioned beyond the second position whereby each article is subjected to a magnetic force which tends to pull the article along the guideway. Hence, each article is maintained engaged with the stop means.

In accordance with one embodiment of the present invention, the magnet means may comprise a permanent magnet having pole pieces which extend along the guideway and which are inclined therewith, the arrangement being such that at the first position along the guideway the pole piece is at a maximum distance from the guideway and at the second position along said guideway the pole pieces are closely adjacent to the guideway. Hence, in accordance with the Inverse Square Law, the field intensity of the magnetic field produced by the magnet means varies from a minimum value at the first position to a maximum value adjacent to the second position.

Alternatively, the magnet means may comprise a plurality of electromagnets which are aligned along the guideway. According to one embodiment, the first of the electromagnets adjacent to the first position produces a magnetic field of minimum intensity. Each subsequent electromagnet produces a magnetic field having a greater intensity. Alternatively, a plurality of electromagnets may be used each producing a magnetic field having the same field intensity. In this embodiment, the electromagnets are inclined with respect to the guideway in a manner similar to the permanent magnet described above. In either embodiment, the field intensity of the magnetic field produced by the electromagnets will vary from a minimum value at the first position to a maximum value at the second position. Hence, a field intensity gradient is provided for propelling each article along the guideway.

The above and other objects and advantages of the various embodiments of the present invention will become apparent from the following detailed description by reference to the accompanying drawings, in which:

FIG. 9 is a side view of a further alternative embodiment of the magnetic conveyor employed in an inverted position;

FIG. 10 is a side view illustrating a further alternative embodiment of the present magnetic conveyor employed in an inverted position; and FIG. 11 is a side view of the magnetic conveyor of FIG. 1 illustrating a further alternative embodiment thereof.

Figure 1:
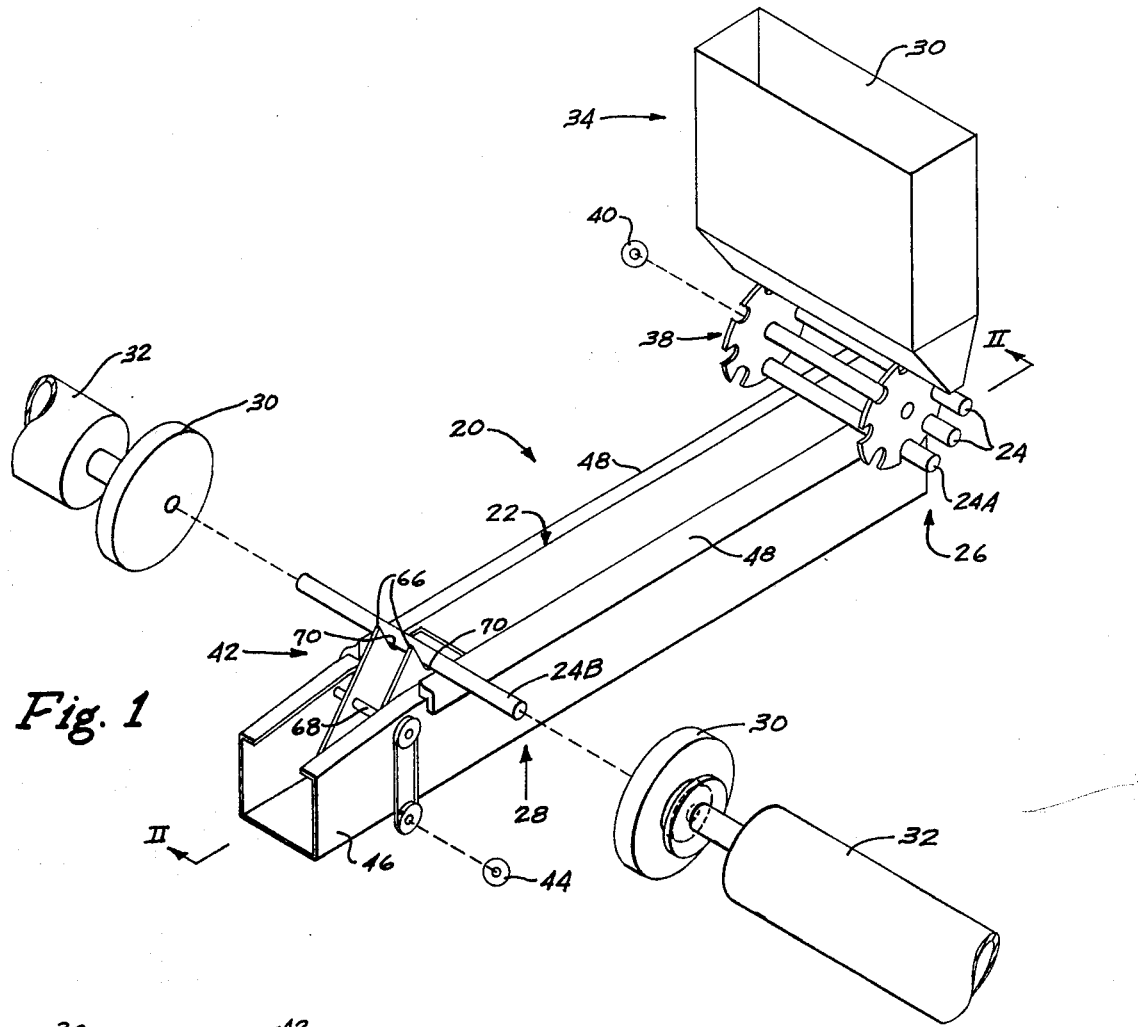
FIGURE 1 is an isometric view of one embodiment of the present magnetic conveyor illustrating its use in transferring axles.

Reference is now directed to FIG. 1 wherein a magnetic conveyor, generally indicated by the numeral 20, is illustrated. The magnetic conveyor includes a guideway 22 upon which elongated cylindrical articles 24 are moved from a first or load position indicated generally at 26 to a second or work position indicated generally at 28. At the first position 26 there is a cylindrical article numbered 24A while at the second position 28 there is a cylindrical article numbered 24B.

In FIG. 1, the elongated articles 24 comprise axles upon which wheels 30, shown spaced from the axle 24B, are secured to the opposed ends thereof. The wheels 30 are maintained in a predetermined position with respect to the second position 28 by any suitable apparatus (not shown). The wheels are moved toward the axle 24B, for example, by means of pneumatic or otherwise operated pistons 32 schematically illustrated in FIG. 1.

At the first position 26 there is provided a feed mechanism 34 which serves to deposit the articles 24 individually on the guideway 22 and at the first position 26. The feed mechanism 34 is schematically illustrated herein and may comprise, for example, a feed box 36 serving as a reservoir for a plurality of the elongated elements 24 and which deposits the cylindrical members 24 individually onto a star-wheel assembly 38. The star-wheel assembly 38 is intermittently rotated by means of a drive schematically illustrated at 40, the arrangement being such that each of the cylindrical elements 24 are individually deposited on the guideway 22 at the first position 26 and thereafter released for movement toward the second position 28.

As will be described, the magnetic conveyor 20 includes a magnet means (not shown) disposed along the guideway 22 which serves to propel each of the cylindrical elements 24 toward the second position 28. At the second position 28 there is provided a stop means 42 which terminates the movement of each of the cylindrical elements 24 along the guideway 22 and aligns them, for example, with the wheels 30. After the wheels 30 have been secured to the opposite ends of the cylindrical element 24B, the stop means is rotated by means of a second drive schematically illustrated at 44 whereby the cylindrical member 24B together with the wheels 30 are displaced from the guideway 22 and discharged therefrom, as will be more fully described later in the specification. Hence, the stop means 42, its pivotal support and the second drive 44 comprise a unitary stop means and discharge means.

It should be evident from the foregoing description that the present magnetic conveyor 20, broadly, functions as a means for conveying elongated cylindrical elements from a first position to a second position whereat a subsequent operation may be performed on the cylindrical element. Thereafter, the cylindrical element is discharged from the magnetic conveyor. It should be understood then that the use of the present magnetic conveyor 20 as illustrated in FIG. 1, i.e., for apply wheels 30 to axles, is to be taken as illustrative of one use of the present magnetic conveyor 20 and that the present magnetic conveyor 20 may be used for other purposes.

Figure 2:
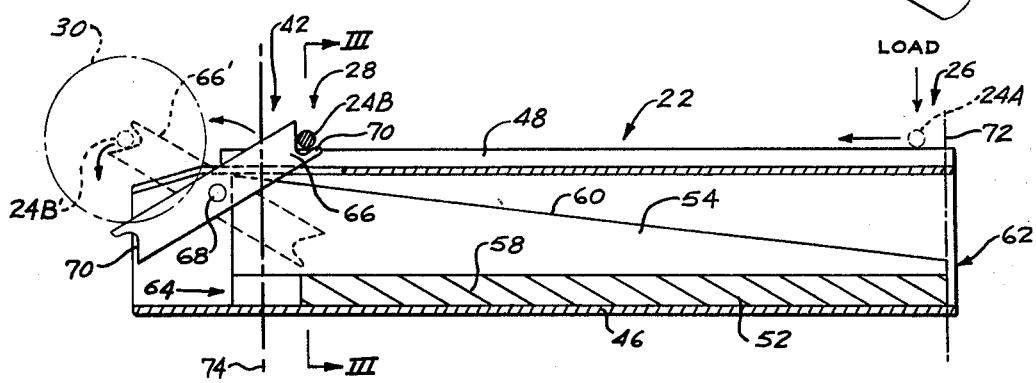
FIG. 2 is a cross-sectional view, taken along line 2—2 of FIG. 1, illustrating the internal construction of the magnetic conveyor of FIG. 1.
Figure 3:
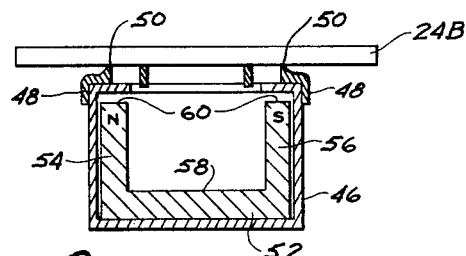
FIG. 3 is a cross-sectional view, taken along line 3—3 of FIG. 2, further illustrating the magnetic conveyor of FIG. 1.

A detailed description of one embodiment of the present magnetic conveyor 20 will follow by reference to FIGS. 1, 2 and 3, inclusive. As can be seen, the magnetic conveyor 20 includes a tubular body 46 of generally rectangular cross section, which preferably is formed from a non-magnetizable material such as aluminum. The guideway 22 comprises a pair of spaced-apart track members 48 also formed from a non-magnetizable material such as aluminum. Each of the track members 48 are secured at one corner of the tubular body 46 by any suitable means.

As can best be seen in FIG. 3, each of the track members 48 has formed therein a sharp edge 50 upon which rests the cylindrical elements 24. The sharp edge 50 minimizes the rolling friction between the cylindrical elements 24 and the track members 48.

As can be seen in FIGS. 2 and 3, a magnet means preferably comprising a permanent magnet 52 is disposed within the tubular body 46. The permanent magnet 52 has a generally U-shaped configuration including a north pole piece 54 and a south pole piece 56 connected together by means of number 58. The north and south pole pieces 54, 56 are bias cut whereby their upper surfaces 60 are inclined with respect to the track members 48. Specifically, at a first end 62 of the permanent magnet 58, the upper surfaces 60 of the north and south pole pieces 54, 56 are spaced from the track members by a maximum distance, while at the opposite or second end 64 of the permanent magnet 58, the upper surfaces 60 of the north and south pole pieces 54, 56 are spaced from the track members 48 by a minimum distance.

As should be evident, the permanent magnet 58 produces a magnetic field which surrounds the track members 48. Preferably, the permanent magnet extends beyond the first and second positions 26, 28 as illustrated in FIG. 2. In accordance with the well-known Inverse Square Law, the inclined north and south pole pieces 54, 56 produce a magnetic field which has a minimum intensity at a point beyond the first position 26 and a maximum intensity at a point beyond the second position 28. The field intensity increases continuously and uniformly along the track members 48 from the first position 26 to the second position 28. Accordingly, there is provided a field intensity gradient which not only maintains a cylindrical member engaged with the track members 48 but also pulls or moves the cylindrical elements along the track members 48. Hence, when a cylindrical element is deposited on the track members 48 at the first position 26, the magnetic field of the permanent magnet 58 will propel the cylindrical element and cause it to roll along the track members 48 toward the second position 28.

In some instances, the maximum field intensity of the permanent magnet and the weight of the cylindrical member 24 will be such that the cylindrical member 24 will be immediately halted at the second position. In this instance, the second position 28 preferably is aligned with that portion of the permanent magnet 58 which produces a magnetic field of maximum intensity. However, in order to maximize the utility of the magnetic conveyor 20, the stop means 42 is provided.

As can be seen in FIGS. 1 and 2, the stop means 42 may comprise a pair of aligned arms 66 which are secured to a shaft 68 extending centrally through the arms 66 and pivotally supported on the tubular body 46. The pair of aligned arms 66 thus are pivotal about the central axis of the shaft 68. At each end of each of the arms 66 there is formed a trough 70 adapted to receive and support the cylindrical element 24B during discharge thereof from the guideway 22. For example, after the wheels 30 (FIG. 1) have been secured to the opposite ends of the cylindrical element 24B, the second drive 44 is activated to pivot the aligned arms 66 through 180° of angular movement. During this arcuate movement, the cylindrical element 24B is picked up in the troughs 70 and is displaced from the track members 48 for discharge beyond the tubular body 46 of the magnetic conveyor 20. As can be seen in FIG. 2, the arms 66 are shown in dotted outline in one position indicated at 66' during its arcuate movement about the shaft 68. The arms in position 66' are shown supporting a cylindrical element 24B' to which are secured the wheels 30.

In FIG. 2 there are illustrated two planes, indicated by the dash-dot lines 72, 74, which are disposed adjacent to the first end 62 and the second end 64 respectively, of the permanent magnet 58. The plane 72 is indicative of that portion of the magnetic field having minimum intensity. The plane 74 is indicative of that portion of that magnetic field having a maximum intensity. Hence, the planes 72, 74 illustrate planes of minimum intensity and maximum intensity.

In the magnetic conveyor 20, the cylindrical elements 24 are loaded onto the track members 48 adjacent to the plane of minimum intensity 72 and preferably between the planes of minimum and maximum intensity 72, 74. In this manner, the cylindrical elements 24 will be immediately effected by the magnetic field and propelled toward the second position 28.

In the present magnetic conveyor 20 the stop means 42 may be positioned to terminate the movement of the cylindrical elements 24 in alignment with the plane of maximum intensity 74. However, it is preferred that the stop means 42 be positioned so as to terminate the movement of the cylindrical elements 24B ahead of the plane of maximum intensity 74. In this manner, the cylindrical elements 24B will be subjected to a vector force which tends to maintain the element 24B in engagement with the track members 48 and also to pull it along the track members 48 thereby maintaining it in engagement with the arms 66. As each cylindrical element is rolled into engagement with the arms 66, it is brought to an immediate stop and is automatically aligned with, for example, the wheels 30 (FIG. 1). Upon completion of subsequent operation performed on the cylindrical elements 24B, the second drive 44

(FIG. 1) is activated to displace the cylindrical element away from the track members 48 for discharge therefrom.

Figure 4:
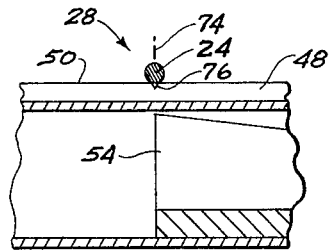
FIGS. 4, 5 and 6 are fragmentary cross-sectional views illustrating alternative embodiments of a stop means employed in the present magnetic conveyor.
Figure 6:
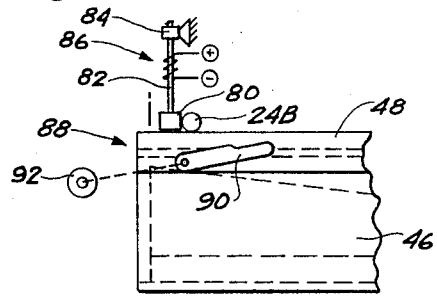
Figure 5:
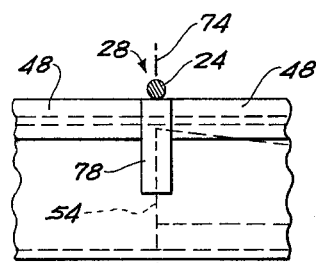

Alternative embodiments of the stop means employed in the present magnetic conveyor 20 are illustrated in FIGS. 4-6, inclusive. Corresponding numerals will be employed to identify corresponding parts already described.

In FIG. 4, each of the track members 48 (only one shown) is provided with a notch 76 cut in the sharp edge 50 thereof. The notches 76 of the track members 48 are aligned in a transverse direction with respect to the track members 48 and function to stop the cylindrical member 24 at the second position 28.

In FIG. 5, each of the track members 48 are provided with an insert 78 which is identical in shape with the track members 48 and forms a continuation thereof. However, the insert 78 is formed from a ferromagnetic material and serves to concentrate the magnetic field emanating from the permanent magnet 58. Thus, as each cylindrical member 24 rolls along the guideway 22 into contact with the insert 78, it will be immediately brought to a halt at the second position 28.

In FIG. 6, there is illustrated a further alternative embodiment of a stop means shown comprising a bar member 80 preferably formed from non-magnetizable material and positioned transversely across the track members 48. The bar member 80 is supported for vertical movement by any suitable means, as for example, by rods 82 extending through guide tubes 84. A portion of the rods 82 may comprise the core of a solenoid 86 employed in elevating the bar member 80 when the cylindrical element 24B is to be discharged. The embodiment of FIG. 6 also includes a discharge means generally indicated at 88 and comprising arms 90 (only one visible) one each secured to each side of the tubular body 46. The arms 90 are pivotally mounted at one of their ends to the tubular body 46 and are rotatable thereabout. Suitable drive means schematically illustrated at 92 serves to rotate the arm 90 about its pivotal connection. After a subsequent operation has been performed on the cylindrical element 24B, the solenoid 86 is activated to elevate the bar member 80 above the cylindrical element 24B. Simultaneously the drive means 92 is activated to pivot the arm 90 into engagement with the cylindrical element 24B thereby moving it to the left of FIG. 6 for discharge from the track members 48.

Figure 7:
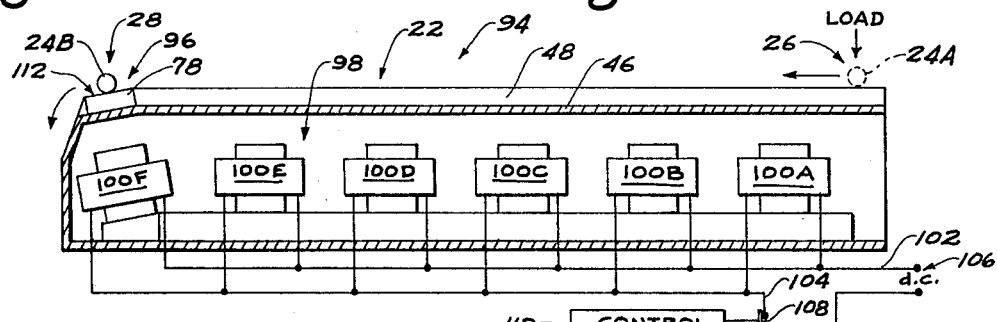
FIG. 7 is a cross-sectional view, similar to FIG. 2, illustrating an alternative embodiment of the present magnetic conveyor in which a plurality of electromagnets are employed.

Reference is now directed to FIG. 7 wherein there is illustrated an alternative embodiment of the present magnetic conveyor generally designated by the numeral 94. The magnetic conveyor 94 is similar in many respects to the magnetic conveyor 20. Accordingly, corresponding numerals will be employed to identify corresponding parts already described.

As can be seen in FIG. 7, the magnetic conveyor 94 includes the tubular housing 46 to which is secured the track members 48. The magnetic conveyor 94 includes stop means 96 which in this embodiment comprises the inserts 78. Alternatively, the stop means 96 could comprise any of the stop means heretofore described in connection with FIGS. 2, 4 and 6.

The magnetic conveyor 94 includes magnet means 98 which in this embodiment comprises a plurality of electromagnets 100A to 100F. The electromagnet 100A produces a magnetic field having a weak or minimum field intensity. Each subsequent electromagnet, that is 100B-100F, produces a magnetic field having a field intensity of increased strength. The electromagnet 100F produces a magnetic field having a strongest or maximum field intensity and is, therefore, disposed at the second position 28. Hence, the magnetic means 98 produce a magnetic field which surrounds the track members 48 whose field intensity increases from a minimum value at one end of the track members 48 to a maximum value at the opposite end of the track members 48. The variation in the field intensity is in stepwise fashion, i.e., not continuous, but is uniformly increased from one end of the track members to the opposite end. Again, a field intensity gradient is provided which propels the cylindrical elements 24 along the guideway 22.

All of the electromagnets 100A-100F are connected in parallel by means of a pair of conductors 102, 104, which extend from a direct current power source indicated at 106. Disposed in the conductor 104, for example, is a switch means 108 serving to energize and deenergize the electromagnets 100A-100F. The switch means 108 is operatively connected to a control circuit generally indicated at 110 which positions the switch means 108 in an ON position or an OFF position. As can be seen, the track members 48 include a sloped portion 112 at the second position. Hence, upon deenergization of the electromagnets 100A-100F, the cylindrical element 24B will be permitted to roll off the track members 48 and be discharged therefrom.

In operation, then, the switch means 108 is closed thereby energizing the electromagnets 100A-100F. A cylindrical element 24A is disposited on the track members 48 at the load or first position 26. As described above, the magnetic field of the magnet means 98 causes movement of the cylindrical element 24A toward the second position 28. At the second position, the stop means 96 brings the cylindrical element 24 to a complete halt. At this time, a subsequent operation is performed on the cylindrical element 24. At the completion of the subsequent operation, the switch means 108 is opened whereupon the solenoids 100A-100F are deenergized. At this time, the cylindrical element 24 at the second position 26, is permitted to roll off the sloped end portion 118 at the end of the track members 48.

Figure 8:
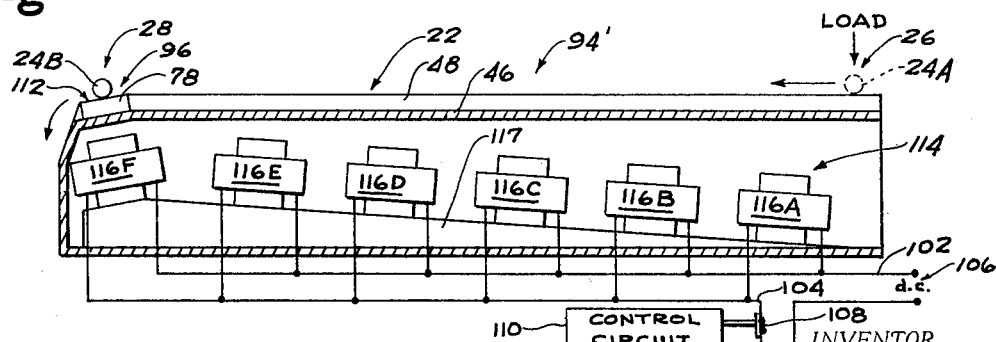
FIG. 8 is a cross-sectional view, similar to FIG. 7, illustrating a further alternative embodiment of the present magnetic conveyor in which a plurality of electromagnets are employed.

In FIG. 8 there is illustrated an alternative embodiment of the magnetic conveyor designated generally by the numeral 94'. The magnetic conveyor 94' is similar in many respects to the magnetic conveyor 94. Hence, corresponding numerals will be employed to identify corresponding parts already described.

In this embodiment a magnet means 114 is employed which comprises a plurality of electromagnets 116A-116F all of which produce magnetic fields of equal strength. However, the electromagnets 116A-116F are secured to an inclined surface 117 whereby the electromagnet 116A is positioned at a maximum distance from the guideway 22 while the electromagnet 116F is positioned at a minimum distance from the guideway 22. In accordance with the Inverse Square Law, the magnetic field produced by the magnet means 114 increases from a minimum intensity at the first position 26 to a maximum intensity at the second position 28 in much the same manner as in the magnetic conveyor 20 of FIGS. 1 and 2. Again, a field intensity gradient is employed to propel the cylindrical elements 24 from the first position 26 to the second position 28.

In the magnetic conveyors 20, 94 and 94', the magnet means 52, 98 and 14, respectively, are disposed below the track members 48 and the cylindrical elements 24 are moved across the top of the track members 48. In order to facilitate discharge of the cylindrical elements 24 after the completion of the subsequent operation, the present magnetic conveyor may be inverted so that the magnet means are above the track members and the cylindrical elements are moved across the bottom of the track members. Further embodiments of the present magnetic conveyor are illustrated in FIGS. 9 and 10. In these embodiments, corresponding numerals will be employed to identify corresponding parts already described.

In FIG. 9, a magnetic conveyor 120 is shown in an inverted position whereby the track members 48 are disposed at the bottom of the tubular body 46. In this position, the star-wheel assembly 38, driven by the drive 40, positions the cylindrical elements 24, individually, at the first position 26. As can be seen, the cylindrical elements 24 engage the sharp edge 50 of the track members 48 which now depends downwardly from the tubular body 46.

The permanent magnet 52 attracts each of the cylindrical elements 24 into engagement with and maintains them engaged with the track members 48. When the star-wheel assembly 38 is rotated, the cylindrical element 24 is released whereupon the magnetic field pulls the cylindrical element 24 along the track members 48 to the second position 28. At the second position 28 there is provided a stop member 122, preferably formed of non-magnetizable material, which extends transversely across the track members 48 and which is secured thereto. Disposed above the cylindrical element 24B is a stripping means 124 shown comprising a bar member 126 which is movable into engagement with the cylindrical element 24 upon activation of a solenoid 128 operatively connected thereto. The solenoid 128 is operated by a suitable control circuit schematically illustrated at 130.

It should be noted that a stripping means 124 is provided on each side of the tubular body 46 and that they are operated simultaneously. After a subsequent operation has been performed on the cylindrical element 24B, the control circuit 130 activates the solenoids 128 to move the bar member 126 into engagement with the cylindrical element 24B so as to displace it away from the track members 48, thereby discharging the cylindrical element 24B from the magnetic conveyor 20.

The magnetic conveyors 94, 94' of FIGS. 7 and 8, also may be employed in an inverted position as illustrated in FIG. 10. As can be seen in FIG. 10, the track members 48 are disposed at the bottom of the tubular body 46. The star-wheel assembly 38, driven by the drive 40, is employed in depositing the cylindrical articles individually at the first position 26. The feed box 36' is again employed in delivering the cylindrical elements 24 to the star-wheel asesmbly 38. Disposed at the second position 28 is a bar member 132, preferably formed from non-magnetic material such as aluminum, serving to stop the cylindrical elements 24 at the second position 28. After the subsequent operation has been performed on the cylindrical element 24B, the switch means 108 is moved to break the electrical circuit thereby deenergizing the magnet means (not shown) of the magnetic conveyor 94 (94'). Upon the deenergization of the magnet means, the cylindrical element 24B is permitted to fall away from the track members 48 into a suitable receptacle (not shown).

Reference is now directed to FIG. 11 wherein a further alternative embodiment of the present magnetic conveyor is illustrated. Corresponding numerals will be employed to identify corresponding parts already described.

As is known, two magnets will repel each other when they are brought together in opposed relation with the north poles and south poles thereof disposed directly opposite each other. This repulsive force, termed "magnetic repulsion" in the specification and in the claims, may be employed in the present magnetic conveyor for maintaining the cylindrical elements spaced from one another during their conveyance along the guideway.

As can be seen in FIG. 11, a magnetic conveyor 134 is provided with the track members 48 which define the guideway 22. A storage bin 136 within which are stored a plurality of the cylindrical elements 24, includes a chute 138 serving to convey the cylindrical elements 24 onto the guideway 22 at the first position 26. The magnetic conveyor 134 includes a magnet means (not shown) which produces a magnetic field about the guideway 22 and whose field intensity increases from the first position 26 to the second position 28, as described above. Accordingly, that magnet means of the magnetic conveyor 134 may comprise any of the magnet means 52, 98 or 114 hereinabove described.

At the second position 28 there is provided a stop means 140 comprising a first bar member 142 preferably formed from non-magnetic material and which is elevated by means of a solenoid 144 operating, for example, on a portion of a shaft 146 connected to the first bar member 142. Pivotally connected to the first bar member 142 by means of a lever arm 148 is a second bar 150 which is adapted to be lowered into the path of the next in line cylindrical element 24. The lever arm 148 is pivotal about a fulcrum 152. Cooperating with the stop means 140 is the above-described discharge means 88 which comprises the pair of arms 90, one each secured to each side of the tubular body 46 of the magnetic conveyor 134. Each of the arms 90 is pivotally mounted at one end to the tubular body 46 and rotated by the drive means 92, schematically illustrated herein.

In operation, when it is desired to discharge the cylindrical element 24B, the solenoid 144 is activated to raise the bar member 142. Simultaneously, the second bar member 150 is lowered into the path of the next in line cylindrical element 24 and the drive means 92 is activated to rotate the arms 90. During their rotation, the arms 90 engage the cylindrical element 24B and displace it from the guideway 22 for discharge therefrom. Thereafter, the bar member 142 is lowered whereupon the second bar member 150 is raised. The next in line cylindrical element 24, now is free to move into the second position 28 and into engagement with the bar member 142.

As can be seen, a plurality of the cylindrical elements 24 is positioned on the guideway 22. These elements 24 are maintained spaced from one another by the magnetic repulsion described above. When the cylindrical element 24B has been discharged and the second bar member 150 has been raised, the next in line cylindrical element 24 will be conveyed to the second position 28. Simultaneously, the remaining cylindrical elements 24 also will move toward the second position 28. However, the repulsive forces between each of adjacent pair of the cylindrical elements 24 will maintain the elements 24 spaced from one another. This should be evident, since, in effect, each of the elements 24 is a magnet having a north pole directly opposite the north pole of the next in line element 24 and a south pole directly opposite the south pole of the next in line element 24. In this embodiment, then, there is very little time lag between the discharge of one element 24 and the positioning of the next in line element 24 at the second position.

Although the invention has been illustrated in connection with certain specific embodiments, it will be readily apparent to those skilled in the art that various changes in form and arrangement of parts may be made to suit requirements without departing from the spirit and scope of the invention.

I claim as my invention:

1. A magnetic conveyor for conveying magnetizable, cylindrical articles, comprising in combination: a guideway; means for depositing said cylindrical articles on said guideway and transversely thereof, said articles being deposited at a first position on said guideway for conveyance to a second position which is spaced from said first position; and magnet means extending along one side of said guideway for producing a magnetic field extending between said first position and said second position, said magnet means being inclined with respect to said guideway whereby the field intensity along said guideway increases from a minimum value at said first position to a maximum value at said second position, the increasing field intensity of said magnet means producing a field intensity gradient which propels said cylindrical articles.

2. A magnetic conveyor for conveying magnetizable, cylindrical elements, comprising in combination: a guideway; means for depositing said elements on said guideway and transversely thereof, said elements being deposited at a first position on said guideway for conveyance to a second position which is spaced from said first position; magnet means positioned adjacent to said guideway for producing a magnetic field extending between said first and second positions, said magnet means being inclined with respect to said guideway from said first position to said second position whereby the field intensity increases from a minimum value at said first position to a maximum value at said second position and produces a field intensity gradient which propels said cylindrical elements from said first position toward said second position; and stop means on said guideway for terminating the movement of said elements along said guideway at said second position.

3. The combination of claim 2 including discharge means for discharging said elements from said magnetic conveyor.

4. The combination of claim 2 wherein said stop means comprises a member positioned in the path of travel of said elements.

5. The combination of claim 4 wherein said member is positioned ahead of the region of said magnetic field of maximum intensity whereby said field intensity gradient will maintain said element engaged with said member.

6. The combination of claim 2 wherein said guideway comprises a pair of track members formed from nonmagnetic material, said stop means comprising notches, one each cut in each of said track members and aligned transversely of said track members.

7. The combination of claim 2 wherein said guideway comprises a pair of track members formed from nonmagnetic material, said stop means comprising inserts forming a continuation of said track members, said inserts being formed from magnetically susceptible material which concentrates the magnetic field of the magnet disposed adjacent thereto.

8. A magnetic conveyor for conveying magnetizable, cylindrical elements, comprising in combination: a guideway; means for depositing said elements on said guideway and transversely thereof, said elements being deposited at a first position on said guideway for conveyance to a second position which is spaced from said first position; magnet means positioned adjacent to said guideway for producing a magnetic field extending between said first and second positions, said magnet means being inclined with respect to said guideway from said first position to said second position whereby the field intensity increases from a minimum value at said first position to a maximum value at said second position and produces a field intensity gradient which propels said elements from said first position to said second position; and unitary stop and discharge means on said guideway for terminating the movement of said elements along said guideway at said second position and for discharging said elements from said magnetic conveyor.

9. The combination of claim 8 wherein said unitary stop and discharge means comprises at least one support member supported for pivotal movement about an axis extending centrally therethrough, said support member having element supporting portions each of which is sequentially positioned with respect to said guideway for engagement by one of said elements, and means for pivoting said support member about said axis whereby each of said elements is displaced from said guideway for discharge therefrom.

10. A magnetic conveyor for conveying magnetizable, cylindrical articles, comprising in combination: a guideway; means for depositing said cylindrical articles on said guideway and transversely thereof; and an elongated permanent magnet having a pair of spaced-apart pole pieces extending parallel with said guideway, said spaced-apart pole pieces being inclined with respect to said guideway whereby the field intensity of said permanent magnet increases uniformly and continuously along said guideway to effect propulsion of said cylindrical articles.

11. A magnetic conveyor for conveying magnetizable, cylindrical articles, comprising in combination: a guideway; means for depositing cylindrical articles on said guideway and transversely thereof; and a plurality of electromagnets aligned along said guideway, all of said electromagnets producing magnetic fields of substantially equal strength, said electromagnets being inclined with respect to said guideway whereby the field intensities of said electromagnets increase uniformly in stepwise fashion with respect to said guideway and cause said cylindrical articles to be conveyed along said guideway.

12. The combination of claim 11 wherein all of said electromagnets are connected to a common source of electrical energy and includes switch means for energizing said electromagnets to convey said cylindrical articles and for deenergizing said electromagnets discharge said cylindrical articles from said guideway.

References Cited by the Examiner
UNITED STATES PATENTS

| | | | |
|---|---|---|---|
| 1,859,764 | 5/1932 | Bougon | 310—12 |
| 3,167,168 | 1/1965 | Park | 198—31 |

EVON C. BLUNK, *Primary Examiner.*

RICHARD E. AEGERTER, *Examiner.*